(No Model.)
G. JIENCKE.
SPRING MOTOR.
No. 317,368. Patented May 5, 1885.
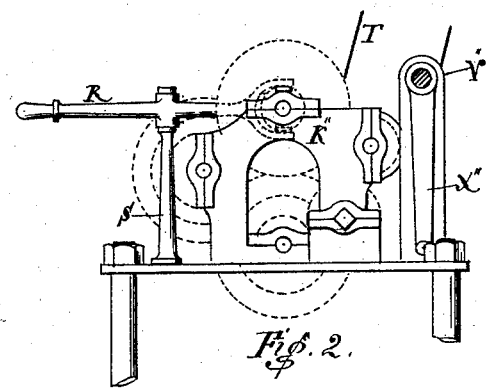
Fig. 2.
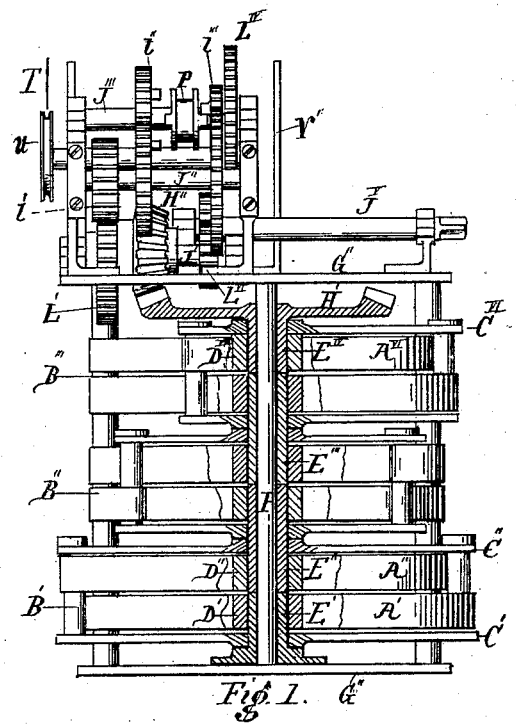
Fig. 1.
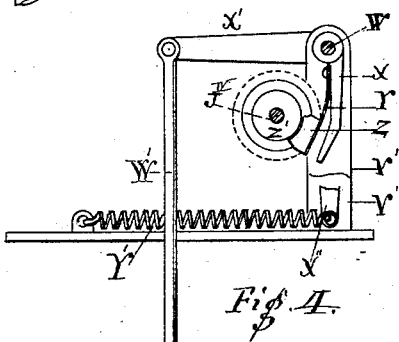
Fig. 4.
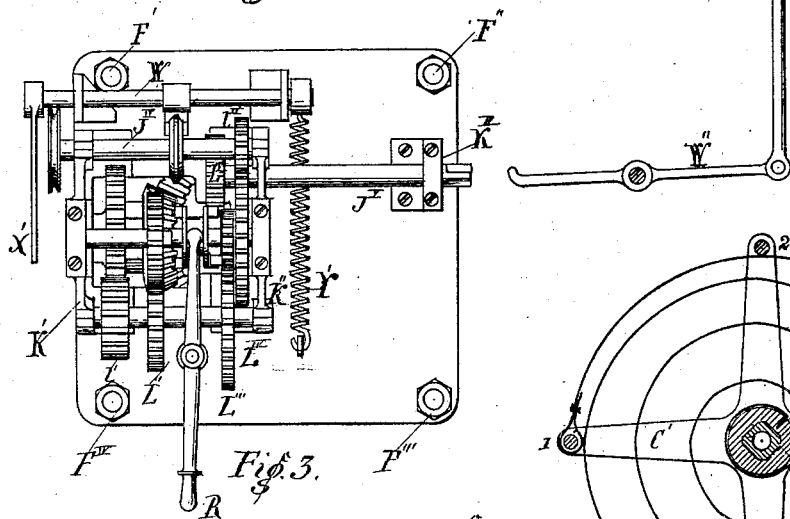
Fig. 3.
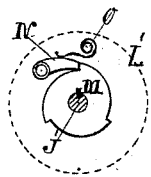
Fig. 5.
Fig. 6.
WITNESSES:
Hermann Roeper.
L. S. White.
INVENTOR
George Jiencke

UNITED STATES PATENT OFFICE.

GEORGE JIENCKE, OF PHILADELPHIA, PENNSYLVANIA.

SPRING-MOTOR.

SPECIFICATION forming part of Letters Patent No. 317,368, dated May 5, 1885.

Application filed November 20, 1884. (No model.)

*To all whom it may concern:*

Be it known that I, GEORGE JIENCKE, a subject of the Emperor of Germany, at present a resident of Philadelphia, State of Pennsylvania, have invented a new and useful Improvement in Spring-Motors, of which the following is a clear and exact description, reference being had to the annexed drawings, making part hereof.

My invention is based on a principle similar to that shown and described in the drawings and specification accompanying Letters Patent No. 273,365, issued to me March 6, 1883, and is designed more particularly for the purpose of running light machinery.

I consider the arrangement of the springs and their connection in my present invention superior to what I claimed and described in the specification referred to.

My invention relates, also, to the means employed for transmitting the power of the springs to the machine to be run by the motor, and also to the mechanism for regulating the speed of the motor; and, finally, to an arrangement for changing the velocity ratio of the gearing to increase the time through which the springs will act.

My invention consists, in brief, in a series of flat springs coiled alternately in different directions, and arranged in suitable cages, to be wound around a series of round bushings, to which they are fixed, and which bushings are fitted onto hollow square shafts projecting from the middle of one cage to the middle of the next cage, the whole being supported by a suitable frame of vertical rods and plates. The speed is regulated by a brake operated by the foot. The gearing consists of suitable wheels and shaftings, a belt-pulley, change-gearing, and a coupling.

Referring to drawings, Figure 1 represents a front view showing the springs and their connections and the gearing. Fig. 2 is a side view showing the gearing and a part of the brake. Fig. 3 is a plan of the top. Fig. 4 is a detached view showing the brake. Fig. 5 is a detached view of a detail belonging to the winding-gear, and Fig. 6 shows one of the springs and its connections.

In Fig. 1, $A'$ $A''$ $A'''$ $A^{IV}$ $A^V$ $A^{VI}$ are coiled flat springs, which are wound alternately in different directions. They are inclosed in the cages $B'$ $B''$ $B'''$, each cage containing a right and a left hand spring. The construction of these cages is shown in Figs. 1 and 6. They consist in the cross-pieces $C'$ $C''$ $C'''$ $C^{IV}$ $C^V$ $C^{VI}$, which are jointed together by the stays 1 2 3 4, said stays receiving the outside ends of the springs, as shown in Fig. 6. The inside ends of the springs are attached to the round bushings $D'$ $D''$ $D'''$ $D^{IV}$ $D^V$ $D^{VI}$, to offer the springs a large enough arbor to prevent their breaking. Another advantage of this arrangement will be pointed out directly. Said bushings $D'$ to $D^{VI}$ are provided with square holes (see Fig. 6) to fit onto a series of hollow square shafts, $E'$ $E''$ $E'''$ $E^{IV}$, which in their turn are fitted onto a vertical stationary shaft, F. The shafts $E''$ $E'''$ $E^{IV}$ are capable of revolving freely on said central shaft, F, whereas the bottom shaft, $E'$, is provided with a flange, to be kept stationary, thus offering a ready means of support for the stationary central rod, F. The shaft $E'$ reaches up into the middle of cage $B'$, and receives the bushing $D'$ with the spring $A'$. Shaft $E''$ reaches from the middle of cage $B'$ to the middle of cage $B''$, and receives the bushings $D''$ and $D'''$ of the springs $A''$ $A'''$. Shaft $E'''$ likewise reaches from the middle of cage $B''$ to that of $B'''$, and carries the bushings $D^{IV}$ and $D^V$ of the springs $A^{IV}$ and $A^V$, and shaft $E^{IV}$ receives the bushing $D^{VI}$ with the spring $A^{VI}$.

The shafts $E'$ $E''$ $E'''$ $E^{IV}$ are provided with round collars where they pass through the cross-pieces $C'$ $C''$ $C'''$ $C^{IV}$ $C^V$ $C^{VI}$ of the cages $B'$ $B''$ $B'''$, and said cages are capable of revolving freely on these shafts $E'$ $E''$ $E'''$ $E^{IV}$. It will now be seen that the diameter of the collars on these shafts $E'$ to $E^{VI}$, where they pass through the cross-pieces $C'$ to $C^{VI}$ of the cages $B'$ $B''$ $B'''$, can be made small in comparison to the diameter of the bushings $D'$ to $D^{VI}$, and the friction of the cages $B'$ $B''$ $B'''$ on their seats will be correspondingly smaller than it would be if the bushings $D'$ to $D^{IV}$ were dispensed with and the diameter of the shafts $E'$ to $E^{IV}$ were increased to such a size as to offer a safe means of attachment for the springs.

Another means of reducing the friction of the cages will be found in the arrangement of each pair of springs in their cage, in attaching the outside coils of the springs on stays opposite each other, as shown in Fig. 1, thus avoiding all lateral pressure of the cages on their seats, no matter how tightly the springs may be wound. These springs and their connections are supported and inclosed by a rigid frame, of which $F'$ $F''$ $F'''$ $F^{IV}$ are the vertical stays, and $G'$ $G''$ are the top and bottom plates, respectively. The hollow shaft $E'$ is securely riveted or screwed onto the bottom plate, $G''$, as shown in Fig. 1, and all the gearing is arranged on the top plate, $G'$.

$H'$ in Figs. 1 and 2 is a bevel-wheel which is fast on the hollow shaft $E^{IV}$, and gears, as shown, into the bevel-pinion $H''$ on a horizontal shaft, $J'$, which is supported by the shields $K'$ $K''$, Figs. 1, 2, and 3. The shields $K'$ $K''$ support all the shafting for the running-gear. A gear-wheel, $L'$, is arranged to ride loosely on the same shaft $J'$, and is capable of revolving freely on it in one direction; but its motion in the opposite direction is checked and prevented by an arrangement of a ratchet-wheel, M, which is keyed on the shaft $J'$, and a retaining-pawl, N, sliding on the teeth of the ratchet-wheel M, (being pressed onto them by a spring, O,) and which is fixed onto the face of the wheel $L'$ by means of a pin on which it loosely fits, as shown in a detached view in Fig. 5. The wheel $L'$ gears into a pinion, $l'$, on a shaft, $J''$, on which it is securely keyed, along with the two cog-wheels $L''$ $L'''$, which are of different diameters. $L''$ $L'''$ gear into the corresponding loose pinions, $l''$ $l'''$, on the shaft $J'''$. The pinions $l''$ $l'''$ are provided with tooth projections on one side of their hubs, as shown in Figs. 1 and 3, and a coupling, P, with corresponding tooth projections, which is capable of sliding longitudinally, but without revolving, on said shaft $J'''$, can be brought into contact with either of the pinions $l''$ $l'''$, and thus the velocity ratio between the two shafts $J''$ and $J'''$ can be changed in proportion to the difference between the diameters of the gear-wheel $L''$ $l''$ and $L'''$ $l'''$, respectively.

$L^{IV}$ is a cog-wheel, which is fast on the shaft $J'''$, and which gears in a fixed pinion, $l^{IV}$, on the shaft $J^{IV}$. (See Fig. 3.) The shaft $J^{IV}$ is extended on the side of the shield $K'$ beyond its bearing in said shield $K'$, to receive a belt-pulley, U, which is keyed onto said shaft $J^{IV}$, and which serves to communicate motion by means of a belt, T, to the machine or apparatus that is to be driven by the motor. The coupling P on the shaft $J'''$ is operated by a shifting-lever, R, supported by a standard, S, as shown in Figs. 2 and 3. Said shifting-lever R partly embraces the coupling P in a suitable annular recess of said coupling P, and by shifting the lever to the right or left the coupling P can be brought into contact with either pinion $l''$ and $l'''$.

The arrangement shown in a detached view in Fig. 4 is the speed-regulator or brake.

$V'$ $V''$, Figs. 1, 2, and 3, are two standards offering supports to a horizontal shaft, W, and carrying a lever or arm, X, Fig. 4, which has a spring, Y, with a brake-block, Z, attached to it, as shown in Fig. 4. The brake-block Z slides against a circular disk, $Z'$, on the shaft $J^{IV}$, Figs. 3 and 4.

$X'$ $X''$ are two levers, which are fixed onto the shaft W, of which $X'$ is connected by the rod $W'$ to the treadle $W''$. A spiral spring, $Y'$, is attached to lever $X''$ and exerts a constant pull on said lever $X''$.

$J^{V}$, Figs. 1 and 3, is a winding-shaft, which is supported by the two pillow-blocks $K'''$ and $K^{IV}$, and which carries a cog-wheel, $L^{V}$, gearing into $L^{VI}$ on the shaft $J'$. (See Fig. 2.) The shaft $J^{V}$ is provided with a square end to receive a crank or key for winding.

Having thus set forth the detailed construction of my device, I will now proceed to explain the operation of the various parts and their relation to each other, and will begin with the winding-gear. By turning the shaft $J^{V}$ by means of a crank or key the wheel $L^{V}$ will impart motion to the cog-wheel $L^{VI}$, and the shaft $J'$, on which $L^{VI}$ is fixed commonly with the bevel-wheel $H''$, will impart rotary motion to the bevel-wheel $H'$ on the hollow shaft $E^{IV}$. The cog-wheel $L'$, which is loose on the shaft $J'$, will remain stationary, as the ratchet-wheel M on the shaft $J'$ and the retaining-pawl N on the wheel $L'$ are so arranged as not to engage with each other when the motor is being wound up. (See Fig. 5.) The bevel-wheel $H'$, which is fast on the hollow shaft $E^{IV}$, as explained above, will turn said shaft around with it on the vertical center shaft, F, and also the bushing $D^{VI}$, which carries the spring $A'$, and thus the top spring will be wound and receive a certain amount of tension, which when great enough to overcome the friction of the cage $B'''$ on the shafts $E^{IV}$ and $E'''$ will take the cage $B'''$ around with it and cause spring $A^{V}$ to be wound from the outside, and spring $A^{V}$ in its turn will cause the hollow shaft $E'''$ to revolve and thus wind $A^{IV}$. In the same manner the spring $A^{IV}$ will wind the spring $A'''$, and so on to the spring $A'$, whose bushing $D'$ is attached to the stationary hollow shaft $E'$, as explained before. The necessity of coiling the spring alternately in different directions will now be understood, the top spring in each cage being wound from the inside, whereas the bottom springs are wound from the outside. The motor thus completely wound up is now in running condition, and the power of the springs is regulated and transmitted in the following manner: The springs in running down will cause the bevel-wheels $H'$ and $H''$ to turn in a direction opposite to that when the motor is being wound, and the ratchet-wheel, Fig. 5, will now engage with the pawl on wheel $L'$ and cause this wheel to revolve with the shaft $J'$, and rotary motion will be imparted to the shaft $J''$ through the pinion $l'$ on said shaft $J''$. The two cog-wheels $L''$ and $L'''$ on the shaft $J''$ will turn the wheels $l''$ and $l'''$ at different speeds, (the wheels $l''$ and $l'''$ being loose on the shaft $J'''$, as explained,) and the speed of the shaft $J'''$ will depend on the position of the coupling P. If it is in the position shown in drawings, it will depend on the difference in the diameters of the wheels L''' and l''', and if it is in the opposite position it will be proportional to the difference in the diameters of the wheels L'' and l''. The difference in the diameters of the wheels L''' and l''' is supposed to be greater than that of L'' and l'', and consequently the number of turns of the shaft J''' for one turn of the shaft J'' will be greater with these two wheels in operation than if L'' and l'' were in operation and the rotary power of the shaft J''' with the wheels L''' and l''' in operation, will be smaller as many times as the difference in the diameters of the wheels L''' and l''' is greater than the difference in the diameters of the wheels L'' l''. The rotary motion of the shaft J''' is now transmitted, by means of the cog-wheel L$^{IV}$ and the pinion l$^{IV}$, to the shaft J$^{IV}$, which carries the driving-pulley U, which in its turn transmits its motion through the belt T to the machine that is to be run by the motor.

My device for regulating the speed of the motor, as shown in Fig. 4, operates in the following manner: It is apparent that by a variation of the pressure of the brake-block Z against the disk Z' the frictional resistance between these two parts can be increased or diminished, and the rotary motion of the shaft J$^{IV}$ proportionately be increased or decreased, and by a pressure sufficiently strong to produce a frictional resistance equal to the rotary power of the disk Z' the motion of the shaft J$^{IV}$ can be stopped altogether. The spiral spring Y', which is attached to the lever X'' on the brake-shaft W, is so proportioned that its pull on the lever X'' will exert a pressure of the arm X against the spring Y and the brake-block Z sufficiently strong to stop the motion of the shaft J$^{IV}$. If, now, by a slight pressure of the foot on the treadle W''', which is connected by the rod W' and the lever X' to the brake-shaft W, the pressure of the brake-block Z against the disk Z' is sufficiently relieved, so that the power of the springs is capable of overcoming the resistance of the friction of the brake, then the shaft J$^{IV}$ will commence to revolve again. The farther the treadle W''' is pressed down the less the pressure of the brake-block Z on the disk Z' will be, and consequently the quicker the speed of the motor will be, till it reaches its maximum, when the brake-block Z is released altogether. When removing the foot from the treadle W''', the spring Y' will at once throw the brake on again and stop the motor. When the motor is completely wound up, the coupling P on the shaft J''' is supposed to be in the position shown in drawings—that is, in contact with pinion l''', which is driven by L''', (the difference of the diameters of these two wheels being supposed to be greater than that of the diameters of the wheels L'' and l'',) and L'' and l'' will run idle. After running for a certain time the power of the springs will be exhausted to such an extent as not to supply sufficient driving-power to the driving-pulley U, and it will then be necessary to shift the coupling P into contact with the wheel l'', and thus engage the wheels L'' l'', and L''' and l''' will run idle. This is effected by means of the hand-lever R on the standard S, as will readily be seen from Figs. 2 and 3.

What I claim as new is—

1. In a spring-motor, the combination of a rigid frame consisting in the vertical rods F F' F'' F''' F$^{IV}$ and the plates G' G'', a series of hollow shafts, E' E'' E''' E$^{IV}$, on the rod F, of which E' is stationary, a series of bushings, D' D'' D''' D$^{IV}$ D$^{V}$ D$^{VI}$, a series of cages, B' B'' B''', consisting in the cross-pieces C' C'' C''' C$^{IV}$ C$^{V}$ C$^{VI}$, and the stays 1 2 3 4, a series of springs, A' A'' A''' A$^{IV}$ A$^{V}$ A$^{VI}$, arranged in couples in said cages B' B'' B''', and coiled alternately in different directions, and attached with their outside coils on stays opposite each other, substantially as and for the purpose described.

2. In a spring-motor, the combination of the springs A' A'', &c., the hollow shafts E' E'', &c., on the shaft F, the bushings D' D'', &c., the cages B' B'', &c., the stays F' F'', &c., the plates G' G'', the shields K' K'', the bevel-wheel H' on the hollow shaft E$^{IV}$, the bevel-pinion H'' on the shaft J', the cog-wheel L', the ratchet-wheel M, the pawl N, the spring O, the pinion l' on the shaft J'', the wheels L'' L''', the pinions l'' l''', the coupling P on the shaft J''', operated by a suitable hand-lever, R, the cog-wheel L$^{IV}$, the pinion l$^{IV}$ on the shaft J$^{IV}$, and the pulley U, with the belt T, substantially as and for the purpose described.

3. In a spring-motor, the combination, with a driving mechanism actuated by springs, arranged as described, of a shaft, J$^{IV}$, with a brake-disk, Z', the two standards V' V'', the brake-shaft W, the lever X'', the spiral spring Y', the lever X, the spring Y, the brake-block Z, the lever X', the rod W', and the treadle W''', substantially as and for the purpose described.

4. In a spring-motor, the combination, with the driving mechanism actuated by springs, as described, of the shafts J'' J''', the wheels L'' L''' l'' l''', the coupling P, and the hand-lever R, substantially as and for the purpose described.

5. In a spring-motor, the combination, with the driving mechanism actuated by springs, arranged in the manner described, of a shaft, J$^{V}$, supported by the pillow-blocks K''' K$^{IV}$, the wheel L$^{V}$, mounted upon said shaft J$^{V}$, the wheel L$^{VI}$, mounted on shaft J', the bevel-pinion H', the ratchet-wheel M, the pawl N, the spring O on the face of the wheel L', and the bevel-wheel H', substantially as and for the purpose described.

GEORGE JIENCKE.

Witnesses:
ANDREW ZANE, Jr.,
S. C. MILLER.